Patented June 8, 1937

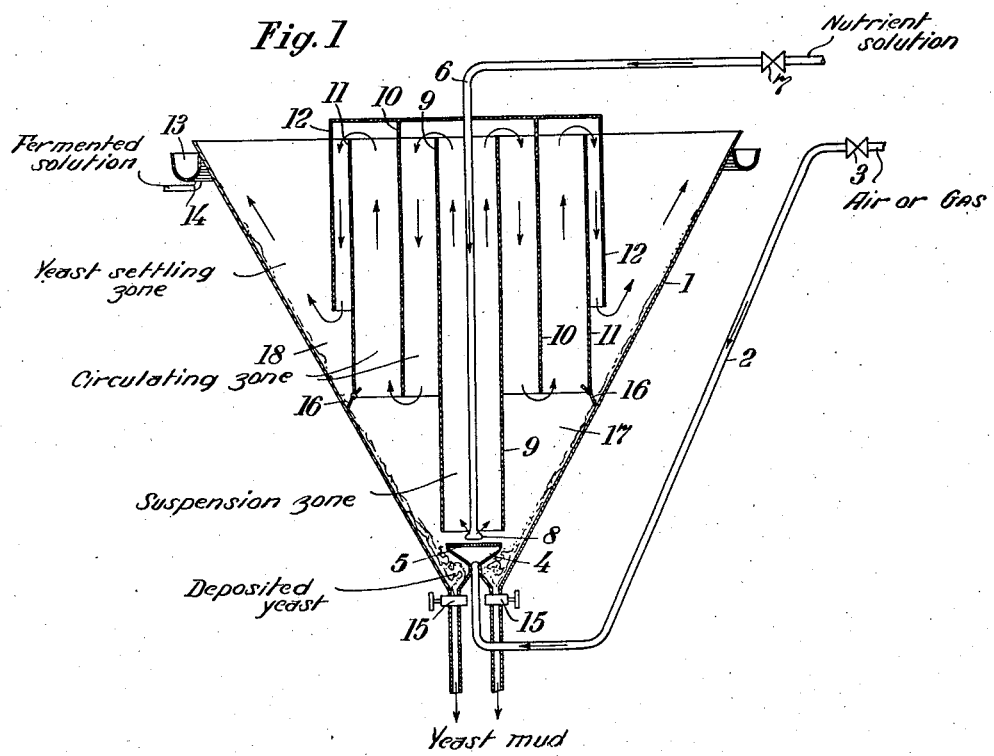
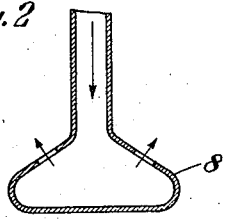

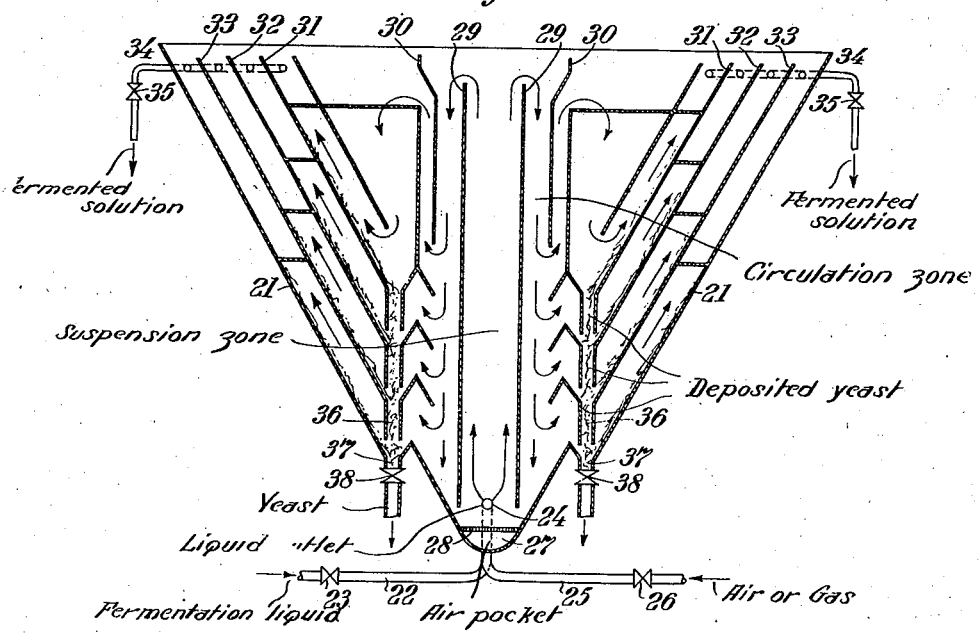
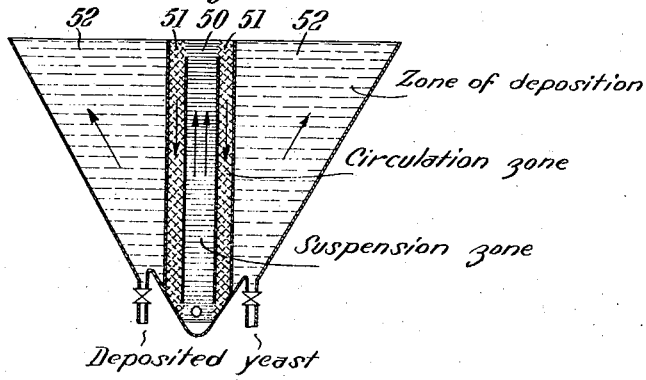

2,083,347

UNITED STATES PATENT OFFICE 2,083,347

METHOD OF FERMENTING SOLUTIONS AND PRODUCING YEAST

Heinrich Scholler, Solln, near Munich, and Rudolf Eickemeyer, Tornesch/Holstein, Germany Application September 24, 1934, Serial No. 745,340
In Germany January 10, 1933

14 Claims. (Cl. 195—94)

This invention relates to a process for the improved and more particularly accelerated production of yeast and for the fermentation of solutions. The method permits yeast to be obtained, and fermentation processes to be carried out, both continuously as well as intermittently. The method depends upon a combination of static and dynamic conditions, more particularly on the action of streaming conditions on suspensions and the deposition thereof and enables a considerable growth in the yeast and the separation of the same from the nutrient liquid to be carried out in a single operation with the complete utilization of all nutrient constituents. The new method is also applicable when the obtention of yeast in substance does not come into question but only its use for biologically acting on the liquid, i. e., for carrying out fermentation processes or the like.

In the following the expressions: fermentation, fermentation apparatus, fermentation liquid, fermented liquid and the like, are employed in the widest sense of the words, and therefore, even when it is in essential a matter of producing the yeast and not a matter of fermentation in the narrower sense of the words.

It is to be distinctly understood that the term "yeast" is used throughout this specification and the claims appended thereto in the widest sense of the word. It includes all varieties of yeast, amongst which may be mentioned top-fermenting and bottom-fermenting yeast, as well as culture yeast and so-called nature yeast.

Processes are already known for making yeast with continuous and discontinuous supply of the fermentation liquid.

It has already been proposed continuously to separate the yeast during the fermentation but the manner of attaining this end has not yet been found.

For the purposes of the fundamental explanation of the essential idea of the present invention the following is premised:

According to the invention fermentation liquid flows through the fermentation chamber and holds the yeast cells present partly in suspension, whilst another part of the yeast present gradually settles on steep inclined surfaces disposed in the fermentation chamber and slides to the bottom as soon as the deposited yeast mud has reached a certain layer thickness. In order to carry this principle into effect operations are carried out preferably with very high pitching quantities of yeast (high yeast concentration). Whereas in the usual processes the quantity of yeast present amounts to only a few percent of the total nutrient substances and fermentation products present, the present method is advantageously carried out with quantities of yeast which are greater than the quantities of nutrient substances or fermentation products present.

The yeast masses which deposit copiously on the inclined surfaces particularly when using high yeast concentrations and which fall down to the bottom can be resuspended in the lower part of the fermentation chamber, for example by means of suitable mechanical stirring devices or else by "stirring with air or other gases." A part of the quantity of yeast, proportioned according to the yeast growth, is preferably gathered or collected at the lower end of the fermentation apparatus, either intermittently or continuously, by letting off through a sluice arrangement, and if necessary thoroughly washed in the known manner, and may be worked up to a dry product.

If the withdrawal of the yeast is effected corresponding to the yeast growth then the yeast concentration in the fermentation chamber can be kept constant in this way. The fermentation liquid flowing through the fermentation chamber leaves the top of the vessel after the nutrient substances contained in it are more or less consumed by the yeast and the yeast suspended in it is wholly or for the most part deposited.

In order to secure a better effect vertical guiding surfaces are preferably disposed in the middle of the fermentation apparatus, said surfaces being tubularly or prismatically arranged. For the purposes of better explanation in the following three zones are distinguished within the fermentation vessel (cf. Figure 4):

1. The suspension zone 50, which is surrounded by the vertical guiding surfaces and in which the yeast is kept in suspension in a high concentration by the upwardly flowing liquid;

2. The settling zone 52 which is disposed outside the suspension zone and in which the velocity of flow is retarded and the direction of flow may even be reversed, so that the yeast has an opportunity to settle on the inclined surfaces and to slide down;

3. In between the suspension zone and the settling zone there may also be the circulation zone 51 in which the fermentation liquid left moves from the top to the bottom and again enters the suspension zone.

The cross section of the suspension zone is preferably dimensioned so that the velocity of flow in that zone is automatically higher than in the settling zone.

It has now been found to be advisable to supply a part of the yeast leaving the suspension zone, and may be also a part of the yeast sliding downwardly on the inclined surfaces, back into the suspension zone again in order to be able to maintain the desired high yeast concentration. This is effected by bringing about additional upward motion of the liquid in the suspension zone by suitable means. In this way the liquid coming over the top of the suspension zone sinks downwardly outside this zone into the so-called circulating zone and through openings provided at the lower end of the suspension zone enters into this latter again, carries along with it the yeast suspended therein and in certain cases drags with it an excess of deposited yeast which may be present and resuspends it. The additional upward motion of the liquid within the suspension zone can be effected in various ways, for example by means of a propeller stirring mechanism which can simultaneously subdivide again and suspend the excess yeast mud, or with avoidance of mechanical devices, by blowing in gases, e. g. air, at the bottom of the suspension zone, in which case the air supply preferably has a cross section somewhat smaller than that of the suspension zone so that an injection action is produced as a result of which the excess yeast mud can be drawn up and suspended.

In the same way the gas blown in also acts according to the principle of the Mammut pump. It has been found that the desired effect can be produced in a particularly efficient manner by fine aeration.

In order to produce better separation of the yeast it is advantageous to install within the settling zone vertical or approximately vertical surfaces which again may be arranged in circular or prismatic fashion and have the object of compelling the liquid to reverse. These reversal surfaces are referred to as recoil surfaces.

A special form of the method consists in regulating the velocity of flow through the apparatus and the yeast concentration so that a part of the yeast suspended in more or less exhausted fermentation liquid leaves the fermentation vessel in order, for the purpose of effecting further working up or deposition, to be subjected to a single or many times repeated treatment in the same or a similar manner.

Further, operations may also be carried out so that no withdrawal of yeast takes place within the first fermentation apparatus and a quantity of yeast corresponding about to the growth of the yeast suspended in the issuing exhausted fermentation liquid leaves the apparatus, then to be separated off in a suitable manner e. g. by means of centrifuges.

This manner of working, which avoids automatic separation of the yeast in the fermentation vessel or at least in the first fermentation vessel, has, as compared with the usual yeast cultivation process, the further advantage that it operates continuously and moreover occupies only comparatively small space. The fermentation apparatus according to the present invention may be connected both in series as well as in parallel. The output capacity of the apparatus is, amongst other things, dependent on the size of the inclined surfaces present. It has therefor been found preferable to arrange several inclined surfaces one above the other, the downwardly sliding yeast, without being stirred up or agitated, being guided by means of suitable funnel-shaped devices from one inclined surface to another down to the lowest inclined surface, where the whole of the downwardly sliding yeast mud unites. The efficiency of an inclined surface is the greater the longer it is. It is preferable, therefore, so to adjust the streaming velocity over the individual inclined surfaces that the time of flow through just suffices to give the yeast opportunity to settle, in other words the rate of flow over the individual inclined surfaces is inversely proportional to the length of the inclined surfaces.

It is already known to promote the flocculation of yeast by adding alkali and by production of phosphate precipitates. It is already known to bring about a similar action by means of flock lactic acid bacteria (referred to in German as "Flockenmilchsäurebakterien"). These known expedients can be used in the present case, the corresponding agents being added either in the settling zone or operations being carried out right from the start under conditions which are favourable for flocculating out yeast. Also yeasts which tend to produce flocculation may be employed in the process right from the commencement.

The apparatus is put into operation in the known manner by means of pitching yeast which is added, preferably in the form of mud, chiefly in the suspension space, whilst the settling and circulation zones are filled with water. The addition of fresh seeding material may also be effected during the continuous operation for the purpose of refreshing the yeast, and takes place preferably within the suspension zone. If necessary, the lead for the fermentation liquid can be used as well for introducing fresh seeding material if a proper pipe for this purpose, like the lead for the fermentation liquid, is not provided. It is known to be advantageous in many respects to subject the yeast, before it is supplied to its purpose of use, to a ripening process, inasmuch as the time the yeast remains in the lower part of the settling and circulation zones is insufficient for ripening, the ripening of the withdrawn yeast may take place in the known manner in a subsequently arranged vessel. Owing to the high yeast concentration the method is comparatively resistant to infection. However, owing to its small space requirement and the continuous manner of working the method may be carried out in a known sterile manner. The high concentration of the yeast also enables the method to be used for working up nutrient solutions which contain fermentation poisons or substances which check fermentation, such as is the case with, for example, wood sugar liquors obtained by hydrolysis with dilute acid. The harmful action of fermentation poisons is reduced or obviated when the quantity of poison gaining access to each yeast cell is on an average very small. The higher, therefore, the yeast concentration can be maintained the less harmful do the poisons become. As an example of such a fermentation poison may be mentioned, for example, aldehydes, which occur more or less regularly in wood sugar liquors. By employing the process according to the present invention these substances lose their harmful action so that it is not necessary to pay particular attention to the presence of these substances. Wood sugar liquors, therefore, can be forthwith used for preparing yeast according to the present invention, whereas in the process heretofore employed sulphite had to be added in order to deprive the aldehyde of its poisoning action.

A further special advantage is that the so-called humin substances contained in the wood sugar liquor are prevented from settling since the fermentation liquid (wood sugar liquor with nutrient salts) flows through the apparatus in a comparatively short time according to the present method. In the case of small apparatus the time of passage through the apparatus in which the fermentation takes place is less than an hour, with large apparatus a flow time of some few hours is to be reckoned with.

The new method with the appertaining devices is further explained in detail below with reference to the accompanying schematic drawings showing, by way of example, the preferred method of carrying out the process and the apparatus necessary therefore. In the accompanying drawings:

Fig. 1 is an axial sectional elevation through a fermentation apparatus with simple treatment device;

Fig. 2 is a detailed representation on a larger scale of the part 8 of Fig. 1;

Fig. 3 is a sectional elevation through an improved form of fermentation apparatus (yeast production vessel), such as is particularly suitable for carrying out the process on a large scale.

Fig. 4 shows the subdivision into zones of the fermentation vessel according to Fig. 2.

In Fig. 1, 1 is an inverted conical or pyramidal vessel into which is led in the proximity of the bottom an air or gas supply pipe 2 with a regulating cock 3 and a fine aeration device 4, which is provided at the top with a filter plate 5 or the like. The supply pipe 6 is for the nutrient solution and has the regulating valve 7 and a funnel-shaped widened portion 8 at the lower end thereof (see also Fig. 2) which is closed underneath and has exit orifices at the top. Tubular or pipe members 9, 10, 11, 12, of cylindrical or polygonal cross section, and open at the bottom and the top, dip into the funnel-shaped vessel 1 at the top thereof; the members with even reference numerals project somewhat out of the funnel-shaped vessel 1, whilst those with odd reference numerals are cut off at about the same level as the upper edge of the vessel or somewhat below this level. An overflow channel 13, with one or several outlets 14, is provided. Closable disks, plates or the like, 15, are provided for letting off the yeast mud. The arrows indicate the most important directions of flow of the gases and liquids.

The procedure according to this invention is as follows:

First consider the funnel-shaped vessel 1 to be full of liquid (nutrient solution). Fresh nutrient solution is then supplied downwardly through the pipe 6 up to the proximity of the filter plate 5 for the air supply. The air streams upwardly in fine small bubbles and, in accordance with the injector or Mammut principle, causes the liquid with a large part of the yeast suspended therein to be guided upwardly again within the pipe 9, as a result of which the yeast has opportunity to grow copiously in the fresh nutrient solution. When the liquid stream reaches the top of the pipe 9 it tends to spread radially outwards, but soon comes up against the projecting end of the pipe 10 and is there downwardly deflected in the annular space between 9 and 10. The pipe 10 terminates at a distance from the side wall of the funnel-shaped vessel such that if necessary a part of the now downwardly moving suspension is led back by the injector action of the aeration device into the ascending current within the pipe 9 and in this way continuously circulates there. Another part of the suspension follows the direction of flow which branches off at the lower end of the pipe 10 and is again brought to the top in the annular space between pipe 10 and pipe 11, where it spreads out in a radial direction again over the top end of the pipe 11, is checked again by the pipe 12 as in the case of the pipe 10, flows down the annular space between pipe 11 and pipe 12, divides anew at the bottom of pipe 12, and so on.

At the first branching point of the direction of flow (at 17 in Figure 1) there is such a check according to the invention that the specifically heavier yeast parts, the settling tendency of which within the pipe 9 has been compensated for and overcome by the action of the ascending small bubbles of air, separate to a considerable extent from the flowing liquid, corresponding to the gravity, sink down on to the wall of the funnel-shaped vessel 1 and then under the action of gravity fall into the lowest part of the vessel, where they either collect around the air supply pipe and can be drawn off from time to time, or where they can be continuously withdrawn by means of suitably opened withdrawal valves or slides.

The circulation flow, which now forces the liquid upwardly again in the space between pipes 10 and 11, takes a part of the yeast with it again but in a much smaller quantity than formerly since there is no air stream here, which latter of course has already left the apparatus again at the top of pipe 9, and since the rate of flow is lower. The separation process is repeated at 18 insofar as the suspension still contains yeast, and the method may be conducted so that the liquid can now be led away practically without any loss in yeast. If the necessity should arise there is nothing to prevent still further pipes being installed for the purpose of completing the yeast separation. According to the conditions of the case in certain circumstances even fewer pipes may be provided than are shown in the accompanying drawings.

The angle of the side wall of the funnel-shaped vessel is determined on the basis of the angle of repose in such a way that, bearing in mind the surrounding liquid medium, a too thick collection of yeast on the wall of the vessel is avoided.

In order to regulate the flow both as regards its direction as well as its partial speed rotatable flaps 16 are provided which enable the cross section of the liquid between the lower end of the pipe in question and the outer wall of the funnel-shaped vessel to be varied at suitable places. These flaps serve more particularly to reduce the impact of the laterally deviated parts of the liquid on the yeast which slides down on the lateral wall. In this way any upsetting of the process is prevented, which was made apparent by the yeast deposited on the upper part of the side wall and travelling in a downward direction being stirred up again and being conducted to the top.

Figure 3 shows a sectional elevation of a fermentation apparatus constructed on essentially the same principle as the apparatus shown in Figure 1, but which is provided with a system of inclined surfaces, and which is capable of handling greater outputs and is suitable for larger scale working. Instead of the funnel-shaped vessel the prismatic trough 21 which narrows off at the bottom is used. The manner in which the apparatus works is as follows:

The fermentation liquid is supplied through the pipe 22 and can be regulated by the valve 23. The fermentation liquid passes through the device 24, which is provided preferably at the top with small openings, into the suspension zone 50 (Figure 4) within the prismatically disposed guiding surfaces 29. At the same time air is introduced into the air space 27 through the pipe 25 and regulating valve 26; this air is finely divided by the air subdividing device (filter 28). The ascending air at the same time sucks up fermentation liquid from below and any excess yeast mud which may be present. At the top edge of the guiding surfaces 29 the liquid enters the circulation zone 51 (cf. Figure 4). A part of the liquid gets into the suspension space again at the lower end of the guiding surface 29 whilst another part flows into the inclined surface system 31, 32 and 33. The baffle surface 30 which is shown is advisable but is not absolutely necessary. The yeast still present in the fermentation liquid deposits on the inclined surfaces 31, 32 and 33 whilst the liquid freed from the yeast can be withdrawn through the run-off pipe 34. The rate of flow between the individual inclined surfaces may amongst other things also be regulated by controlling the withdrawal (by means of valve 35) in which case a separate regulable withdrawal device may be arranged between each two inclined surfaces.

The yeast which settles on the inclined surfaces 31, 32 and 33 and on the inclined wall of the trough 21 slides to the bottom and is collected by the funnel-shaped devices 36 in such a way that reagitation of the yeast is avoided. The collecting yeast mud can be withdrawn by means of the pipe 37 and closure member 38.

In Figure 4 the three zones of the fermentation apparatus, the suspension zone 50, the settling zone 52 and the circulation zone 51 are indicated schematically. The individual zones 50, 51 and 52 are distinguished by shading. The circulation path lies in the zones 50 and 51. The advantages of the method as compared with the methods heretofore employed consist in the small space requirement and the high performance of the apparatus, in the automatic separation of the yeast, in the resistivity of the fermentation process to infection and fermentation poisons, in the suitability for carrying out sterile fermentation and, in as much as aeration takes place, in an economical and efficient aeration method which consists in this that in view of the high yeast concentration present in the suspension space only comparatively small quantities of air are used.

What we claim is:—

1. A method of fermenting solutions and producing yeast which comprises causing a circulation along a path containing an upwardly and a downwardly directed portion within a bulk of fermentation liquid containing yeast in suspension, continuously supplying fresh nutrient solution to the fermentation liquid at the beginning of the ascending portion of said circulation path, conducting the descending fermentation liquid from the circulation path into an upwardly widening path, depositing yeast from the liquid by gravity action in said upwardly widening path, guiding the depositing yeast under the action of gravity to the proximity of the beginning of the ascending portion of the circulation path whereby yeast is resuspended in the liquid traversing the circulation path, and continuously withdrawing used liquid from the bulk of fermentation liquid at the top of the upwardly widening path.

2. A method as claimed in claim 1 in which the circulation within the bulk of fermentation liquid is effected by mechanical means moving the liquid in the ascending portion of the circulation path.

3. A method as claimed in claim 1 in which finely divided gas is introduced into fermentation liquid at the bottom of the ascending portion of the circulation path, which gas assists the ascension of the liquid in this portion of the path.

4. A method as claimed in claim 1 in which the rate of flow of the fermentation liquid is changed at at least one point.

5. A method as claimed in claim 1 in which the rate of flow of the fermentation liquid is changed at at least one place of transition from a descending flow to an ascending flow.

6. A method as claimed in claim 1 in which the yeast withdrawn is subjected to an after-ripening process.

7. A method as claimed in claim 1 in which fresh yeast is added as seeding material to the fermentation liquid in the circulation path.

8. A method as claimed in claim 1 in which wood sugar wort is used as the fermentation liquid.

9. A method as claimed in claim 1 in which the used fermentation liquid is guided in the upwardly widening path along a course which contains ascending and descending portions.

10. A method as claimed in claim 1 in which the used fermentation liquid flows in a plurality of parallel streams in the upwardly widening path.

11. A method as claimed in claim 1 in which yeast which has settled out of the fermentation liquid is withdrawn therefrom.

12. In a method of fermenting solutions and producing yeast, the steps which comprise causing a fermentation solution containing yeast in suspension to flow in an upwardly and downwardly directed path, and then causing the solution to flow and contact inclined surfaces on which the yeast is deposited and slides by gravity to the place of collection.

13. In a method of fermenting solutions and producing yeast, the steps which comprise causing a fermentation solution containing yeast in suspension to flow in an upwardly and downwardly directed path, and then causing the solution to flow at a rate of speed slower than it flowed in said directed path and contact inclined surfaces on which the yeast is deposited and slides by gravity to the place of collection.

14. A method of fermenting solutions and producing yeast which comprises causing a fermentation solution containing yeast in suspension to flow in an upwardly and downwardly directed path, continuously supplying fresh nutrient solution to the fermentation liquid at the beginning of the flow in the upwardly directed path, causing the solution to flow in an upward direction and contact inclined surfaces on which the yeast is deposited and slides by gravity to the place of collection, and continuously withdrawing the liquid from which the yeast has been deposited.

HEINRICH SCHOLLER.
RUDOLF EICKEMEYER.